United States Patent Office 3,490,038
Patented Jan. 13, 1970

3,490,038
RESISTANCE MEASURING APPARATUS HAVING A MAGNETIC MODULATOR FOR COMPARING THE RESISTANCE RATIO OF TWO RESISTORS
Norbert L. Kusters and Malcolm P. MacMartin, Ottawa, Ontario, Canada, assignors to Canadian Patents and Development Limited, Ottawa, Ontario, Canada, a corporation of Canada
Filed Dec. 7, 1967, Ser. No. 688,874
Int. Cl. G01r 27/02
U.S. Cl. 324—62         4 Claims

ABSTRACT OF THE DISCLOSURE

A resistance measuring bridge wherein the two resistors to be compared are fed from two isolated direct current supplies and the two currents flowing in the resistors are compared in a direct current comparator of the type having two ratio windings wound on a double core, each of which have modulation-detection windings wound thereon. These latter windings are energized from a square-wave oscillator and provide an output voltage related to ampere-turn imbalance of the ratio windings. This voltage is fed-back to one of the direct current supplies to vary its output until ampere-turn balance is achieved and the current ratio is equal to the turns ratio of the ratio windings.

---

This invention relates to a resistance measuring bridge and more particularly to a ratio bridge for four-terminal resistance measurements incorporating a direct-current-comparator.

In recent years there has been little or no progress or improvement in the methods and techniques for measurement of direct current resistors which form the basis of our system of electrical units. Considerable progress has been made in alternating current impedance measurements, however, through the use of ratio transformers which have excellent ratio stability plus high magnetizing and low leakage impedances. The invention described below is a successful attempt to introduce the advantages of ratio transformers to direct current resistance measurements.

The four-terminal resistance of a resistor is defined as the ratio of the voltage between its potential terminals to the current passing through its current terminals when no current passes through its potential terminals. Four-terminal resistances can be compared by measuring either the voltage ratio corresponding to current equality or the current ratio corresponding to voltage equality. In the standard potentiometer method, the two resistors to be compared are connected in series to ensure current equality and the corresponding voltage drops are each measured separately by a potentiometer. The main advantage of this method is that the measurement is completely free from any effect of potential lead resistances. Its main disadvantage is that it requires a current ratio stability between the resistor circuit and the potentiometer circuit which is at least as good as the resolution required in the measurement. When this resolution approaches one part per million the corresponding current ratio stability is difficult if not impossible to achieve since it is affected by both battery drift and lead resistance variations. These difficulties of the potentiometric method can be obviated by using the Kelvin double bridge method of measurement or the conjugate of the Kelvin double bridge method.

In the Kelvin double bridge method the same current is made to flow in the two resistors by connecting them in series, but the voltage ratio is determined directly by resistive voltage dividers connected to the potential terminals. This connection cannot be made, however, without a current drain from the potential terminals and additional auxiliary balances are required to eliminate the effect of potential lead resistances. The adverse effect of battery drift is completely eliminated, but lead resistance variations still affect the result. The lead resistances concerned are in the potential circuit, however, where the total resistance level can be made sufficiently high to reduce the effect to a tolerable level.

In the conjugate of the Kelvin double bridge, currents which are adjustable in ratio are made to flow in the two resistors to establish voltage equality. At balance, no current flows in the galvanometer potential leads but the condition that no current flows in the other potential leads has to be established by an auxiliary balance. The need for this auxiliary balance could be eliminated if the two currents flowing in the two resistors being compared were obtained from osilated sources instead of from the same source and if it were possible to measure the ratio of the currents in the two isolated circuits.

The current comparator is a current ratio indicator based on the detection of a zero flux condition in a magnetic core. For alternating current operation the detector consists of a single magnetic core with a uniformly distributed detection winding but for direct current operation it is normal practice to use a double core magnetic modulator. A current comparator of this type is described in a paper "A Current Comparator for the Precision Measurement of D.C. Ratios" by N. L. Kusters, W. J. M. Moore, and P. N. Miljanic, published in Communications and Electronics, January 1964 and a paper "A Self-Balancing Direct Current Comparator for 20,000 Amperes" by M. P. MacMartin and N. L. Kusters published in IEEE Transactions on Magnetics, December 1965. The design of a comparator of this type is also described and claimed in United States Patent No. 3,188,-562 issued June 8, 1965 to N. L. Kusters and W. J. M. Moore.

It is an object of the present invention to provide a bridge circuit for comparing the resistance values of two resistors.

It is another object of the invention to provide a ratio bridge for four-terminal resistance measurements.

It is another object of the invention to provide a bridge circuit wherein the currents flowing in the two resistors being compared are derived from isolated power sources and the ratio between the two currents is measured by a current comparator.

These and other objects of the invention are achieved by a direct-current-comparator bridge wherein the two resistors to be compared are fed separately from isolated direct current supplies and the two currents are compared in a direct current comparator. The resistance ratio is obtained when the voltage drops across the resistors are equal and the ratio of the two currents is precisely known. The voltage balance would be conveniently obtained with a galvanometer and the current ratio is obtained by a current comparator device which has a feed-back function to adjust one of the currents until the current ratio is equal to the indicated ratio (turns ratio).

In drawings which illustrate embodiments of the invention,

Figure 1:
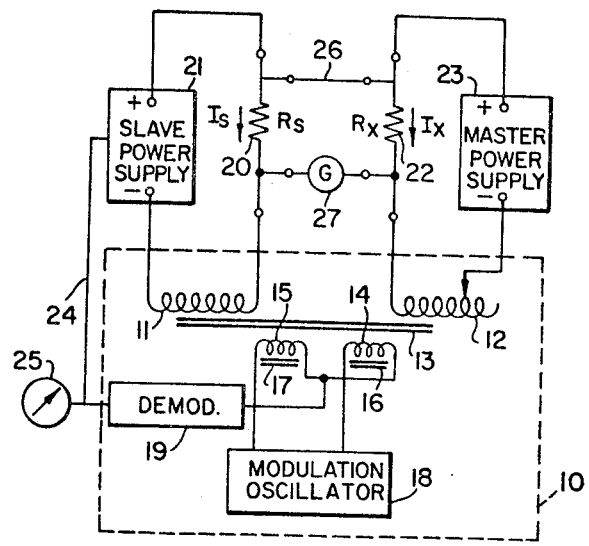
FIGURE 1 is a circuit diagram of a preferred form.

Referring to FIGURE 1, a direct current comparator ratio bridge is shown with the comparator indicated generally as 10. The comparator comprises a first ratio winding 11 and a second ratio winding 12 wound on a magnetic shield 13 which in turn completely surrounds a double toroidal core magnetic modulator made up of double cores 16 and 17 and modulation windings 14 and 15 wound thereon. The ratio windings link both the modulator and the magnetic shield 13. This shield is most important in that it increases the accuracy of the device by making it insensitive to ambient magnetic fields either internally or externally generated and it reduces the coupling between the ratio windings and the modulator. The sensitivity of the modulator can thus be made very nearly independent of the impedance levels in the ratio windings. The shield would preferably be made of high permeability magnetic material.

The modulation windings 16 and 17 are energized or modulated by a modulation oscillator 18. Known forms of device could be used for the oscillator and the modulator but a preferred circuit would be that disclosed in Canadian Patent No. 769,229 issued on Oct. 10, 1967 to M. P. MacMartin and N. L. Kusters and titled "Magnetic Modulator for a Direct Current Comparator." The modulator signal appearing at the interconnected ends of windings 16 and 17 is a peaked alternating voltage of mainly fundamental frequency. Direct current in the ratio windings 11 and 12 add even harmonics to this signal increasing the peaks of one polarity and decreasing those of opposite polarity. Demodulator 19 generates a direct voltage proportional to the difference between the positive and negative peaks and thus is proportional to the net direct current in the ratio windings.

The two resistors to be compared 20 and 21 which would normally be a standard resistor $Rs$ and an unknown or test resistor $Rx$ are connected to a slave power supply 21 and a master power supply 23 respectively. These power supplies cause currents $Is$ and $Ix$ to flow through resistors 20 and 22 respectively and also through ratio windings 11 and 12 in the comparator 10. A null balance detector 25 is provided to indicate ampere-turn balance between ratio windings 11 and 12. An output from the demodulator 19 is taken via line 24 and acts to vary the current output $Is$ of the slave power supply such that a null reading (ampere-turn balance) is obtained at the comparator. A potential connection 26 and a galvanometer are connected between circuits to measure and detect voltage balance between the two resistors.

In operation to compare two resistors, a voltage balance is obtained at the galvanometer and the current ratio is obtained directly from the turns ratio of windings 11 and 12, the number of windings on which will be designated as $Ns$ and $Nx$ respectively. At balance $$\frac{Rx}{Rs}=\frac{Gs}{Gx}=\frac{Is}{Ix}=\frac{Nx}{Ns}$$

If $Ns$ is made adjustable, the bridge is a direct reading resistance bridge $$Rx=\frac{Ns}{Nx}Gs$$

If $Ns$ is made adjustable the bridge is a direct reading conductance bridge with the two conductances ($Gs$ and $Gx$) being related as follows:

$$Gx=\frac{Ns}{Nx}Gs$$

Figure 2:
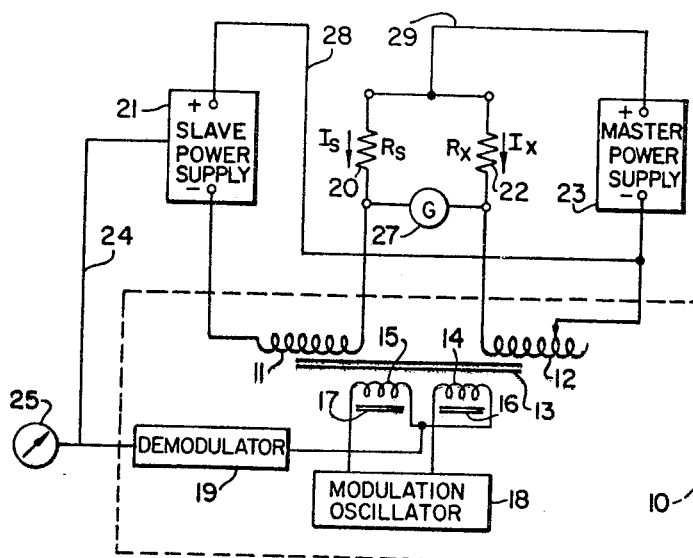
FIGURE 2 is a circuit diagram showing alternative current connections.

FIGURE 2 shows a possible alternative circuit connection. All component parts are identical to that of FIGURE 1 but in this case the currents $Is$ and $Ix$ are derived from the master power supply with the slave power supply providing a difference or compensating voltage to keep the comparator balanced. This circuit is operated in the same manner as the first circuit but may be used if two-terminal resistance measurements are adequate for the tests being carried out.

If a comparator is built without a magnetic shield 13, reasonable accuracy can only be obtained if the ratio windings are uniformly distributed and tightly coupled. Because the magnetic shield eliminates these requirements almost completely the ratio windings can be designed on such considerations as direct reading features, ease of operation, and ratio range. For practical reasons the largest number of turns in any one ratio winding is about a thousand. This provides a maximum resistance of one thousand to one which is quite adequate. The corresponding per turn resolution of the bridge of one in a thousand is too low for most purposes but this can readily be extended to one in a million by a resistance divider network (not shown). The design of such a network is well within the skill of those in the potentiometer field and is not elaborated here.

The demodulator used would preferably comprise a rectifier network to give a direct voltage output and an amplifier to enhance the signal and provide sufficient feedback loop gain to effectively control the current output of the slave power supply.

What is claimed is:
1. Resistance measuring apparatus for comprising the resistance ratio of two resistors comprising:
   (a) a direct current comparator comprising first and second cores, modulation windings on each of said cores, an oscillator connected to said modulation windings to energize them with a modulation signal, a magnetic shield surrounding said cores and windings, first and second ratio windings wound on said magnetic shield and linking said cores, and means for detecting ampere-turn imbalance in the double cores and providing an error signal output,
   (b) a master power supply for supplying a first direct current to one of the resistors and to the first ratio winding,
   (c) a slave power supply for supplying a second direct current to the other resistor and to the second ratio winding,
   (d) a feed-back connection from the means for detecting ampere-turn imbalance to the slave power supply such that its current output is varied to bring the cores in the comparator to the ampere-turn balance condition, and
   (e) voltage measuring means for detecting voltage balance across the resistors.
2. A resistance measuring apparatus as in claim 1 wherein at least one of said ratio windings has tapping points to vary the effective number of turns of that winding on the comparator.
3. Resistance measuring apparatus for comparing the resistance ratio of two resistors comprising:
   (a) a direct current comparator comprising first and second cores, modulation windings on each of said cores, an oscillator connected to said modulation windings to energize them with a modulation signal, a magnetic shield surrounding said cores and windings, first and second ratio windings wound on said magnetic shield and linking said cores, and means for detecting ampere-turn imbalance in the double cores and providing an error signal output,
   (b) a master power supply and a slave power supply for supplying direct current to the resistors,
   (c) connections from said resistors to said ratio windings of the comparator such that the current flowing through one of the resistors respectively also flows through the first ratio winding and the current flowing through the other resistor also flows through the second ratio winding,
   (d) a feed-back connection from the means for detecting ampere-turn imbalance to the slave power supply such that its current output is varied to bring the cores in the comparator to the ampere-turn imbalance condition, and
   (e) voltage measuring means for detecting voltage balance across the resistors.
4. A resistance measuring bridge as in claim 3 wherein at least one of said ratio windings has tapping points to vary the effective number of turns of that winding on the comparator.

(References on following page)

References Cited

UNITED STATES PATENTS

| | | | |
|---|---|---|---|
| 1,506,552 | 8/1924 | Angus | 324—62 |
| 2,560,132 | 7/1959 | Schmitt | 324—43 X |
| 2,760,158 | 8/1956 | Kerns | 324—117 X |
| 3,334,296 | 8/1967 | Rogal et al. | 324—62 |

EDWARD E. KUBASIEWICZ, Primary Examiner

U.S. Cl. X.R.

323—43.5; 324—117